(12) United States Patent
Hirano et al.

(10) Patent No.: US 10,845,792 B2
(45) Date of Patent: Nov. 24, 2020

(54) FAILURE DIAGNOSIS APPARATUS, MONITORING APPARATUS, FAILURE DIAGNOSIS METHOD AND RECORDING MEDIUM

(71) Applicants: Kabushiki Kaisha Toshiba, Tokyo (JP); Toshiba Energy Systems & Solutions Corporation, Kawasaki (JP)

(72) Inventors: Toshio Hirano, Yokohama Kanagawa (JP); Yoshihiro Taniyama, Shinagawa Tokyo (JP); Masayuki Ichimonji, Kita Tokyo (JP)

(73) Assignees: Kabushiki Kaisha Toshiba, Tokyo (JP); Toshiba Energy Systems & Solutions Corporation, Tokyo (JP)

( * ) Notice: Subject to any disclaimer, the term of this patent is extended or adjusted under 35 U.S.C. 154(b) by 369 days.

(21) Appl. No.: 15/907,322

(22) Filed: Feb. 28, 2018

(65) Prior Publication Data
US 2018/0276322 A1 Sep. 27, 2018

(30) Foreign Application Priority Data

Mar. 24, 2017 (JP) ................................ 2017-060127
Jan. 17, 2018 (JP) ................................ 2018-005925

(51) Int. Cl.
*G05B 23/02* (2006.01)
*G01M 99/00* (2011.01)
(Continued)

(52) U.S. Cl.
CPC ....... *G05B 23/0243* (2013.01); *G01M 99/005* (2013.01); *G05B 17/00* (2013.01);
(Continued)

(58) Field of Classification Search
None
See application file for complete search history.

(56) References Cited

U.S. PATENT DOCUMENTS 4,897,607 A * 1/1990 Grunewald ............ G01R 31/12
324/512
2005/0182613 A1* 8/2005 Kwun .................... G01N 29/46
703/18
(Continued)

FOREIGN PATENT DOCUMENTS

JP 2016-70272 A 5/2016
WO WO 2014/202100 A1 12/2014

OTHER PUBLICATIONS

Borgatti, "Measures of Similarity and Distance" Boston College, available at https://web.archive.org/web/20151225114103/http://www.analytictech.com/mb876/handouts/distance_and_correlation.htm (Dec. 25, 2015) (Year: 2015).*

(Continued)

*Primary Examiner* — John C Kuan
(74) *Attorney, Agent, or Firm* — Finnegan, Henderson, Farabow, Garrett & Dunner, L.L.P.

(57) ABSTRACT

In one embodiment, a failure diagnosis apparatus includes a simulation module configured to simulate a target device to output virtual measured data obtained when the target device is in at least any one of one or more failure modes. The apparatus further includes a measured data obtaining module configured to obtain measured data that is measured from the target device. The apparatus further includes a failure mode identifying module configured to identify a failure mode of the target device based on the virtual measured data and the measured data.

9 Claims, 5 Drawing Sheets

(51) Int. Cl.
  *G05B 17/00* (2006.01)
  *G05B 17/02* (2006.01)
(52) U.S. Cl.
  CPC .......... *G05B 17/02* (2013.01); *G05B 23/0254* (2013.01); *G05B 23/0281* (2013.01)

(56) References Cited

U.S. PATENT DOCUMENTS

| | | | | |
|---|---|---|---|---|
| 2005/0256655 | A1* | 11/2005 | Iwasa | G06F 11/263 702/35 |
| 2009/0300429 | A1* | 12/2009 | McCroskey | G06F 11/079 714/48 |
| 2012/0215509 | A1 | 8/2012 | Callot et al. | |
| 2016/0032918 | A1* | 2/2016 | Wagner | F04D 25/16 417/53 |
| 2016/0091397 | A1 | 3/2016 | Shinkle et al. | |
| 2017/0328811 | A1* | 11/2017 | Mori | G01M 15/02 |

OTHER PUBLICATIONS

Trinh et al., "Design of a soft sensor for the oscillatory failure detection in the flight control system of a civil aircraft" 2010 IEEE International Symposium on Industrial Electronics, Bari, 2010, pp. 2061-2066 (Year: 2010).*

Huang et al., "Fault Simulator Based on a Hardware-in-the-Loop Technique" IEEE Transactions on Systems, Man, and Cybernetics—Part C: Applications and Reviews, vol. 42, No. 6, Nov. 2012 (Year: 2012).*

\* cited by examiner

FAILURE DIAGNOSIS APPARATUS, MONITORING APPARATUS, FAILURE DIAGNOSIS METHOD AND RECORDING MEDIUM

CROSS REFERENCE TO RELATED APPLICATIONS

This application is based upon and claims the benefit of priority from the prior Japanese Patent Applications No. 2017-060127, filed on Mar. 24, 2017 and No. 2018-005925, filed on Jan. 17, 2018, the entire contents of which are incorporated herein by reference.

FIELD

Embodiments described herein relate to a failure diagnosis apparatus, a monitoring apparatus, a failure diagnosis method and a recording medium.

BACKGROUND

To improve operation rates of instruments in a power plant, development of a failure diagnosis system for the power plant by using an internet of things (IoT) technology has been studied. This can realize excellent online failure diagnosis using abundant measured data and allows early sensing of failure and a symptom of failure of a target device of diagnosis. However, to appropriately perform the failure diagnosis, there are problems of a method for configuring a database and an algorithm for accurately sensing the failure and the symptom of failure from the measured data. Similar problems may occur for various instruments (such as an instrument in an infrastructure facility other than the power plant) that cause great influence if they stop operating due to failure.

DETAILED DESCRIPTION

Embodiments will now be explained with reference to the accompanying drawings.

In one embodiment, a failure diagnosis apparatus includes a simulation module configured to simulate a target device to output virtual measured data obtained when the target device is in at least any one of one or more failure modes. The apparatus further includes a measured data obtaining module configured to obtain measured data that is measured from the target device. The apparatus further includes a failure mode identifying module configured to identify a failure mode of the target device based on the virtual measured data and the measured data.

First Embodiment

Figure 1:
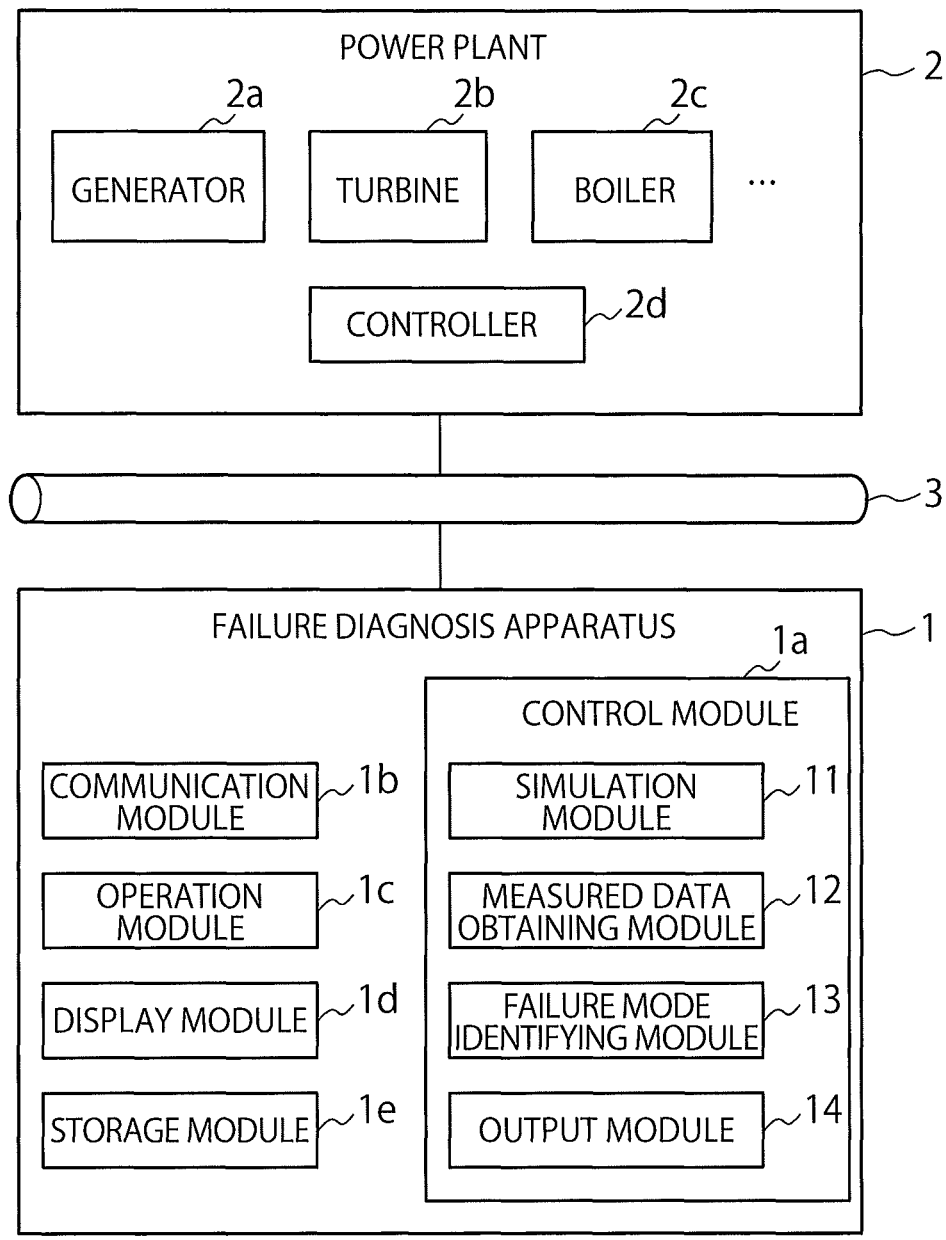
FIG. 1 is a schematic view showing a configuration of a failure diagnosis system of a first embodiment.

FIG. 1 is a schematic view showing a configuration of a failure diagnosis system of a first embodiment. In the failure diagnosis system shown in FIG. 1, a failure diagnosis apparatus 1 and a power plant 2 are connected to each other over a communication network 3.

The failure diagnosis apparatus 1 includes a control module 1a, such as a processor, a communication module 1b, such as a communication interface, an operation module 1c, such as a keyboard, and a mouse, a display module 1d, such as a monitor, and a storage module 1e, such as a memory and a storage. The control module 1a includes a simulation module 11, a measured data obtaining module 12, a failure mode identifying module 13, and an output module 14. The functional blocks of the control module 1a are achieved, for example, when the processor of the control module 1a executes a failure diagnosis program stored in the storage of the storage module 1e. The failure diagnosis program may be installed from a recording medium onto the failure diagnosis apparatus 1 or may be downloaded from a server on the communication network 3 onto the failure diagnosis apparatus 1.

The power plant 2 includes instruments, such as a generator 2a, a turbine 2b, and a boiler 2c, and a controller 2d, which controls the operations of the instruments. In the present embodiment, the instruments are target devices of diagnosis by the failure diagnosis apparatus 1. The power plant 2 is, for example, a thermal power plant, but the type of power generation is not limited to thermal power generation. Target devices of diagnosis by the failure diagnosis apparatus 1 are not limited to the power plant 2 and may be other facilities including general industrial instruments, such as an engine, a compressor, and a pump.

The simulation module 11 is a block that performs data processing that is a simulation of the behavior of a target device and performs the simulation by using a model corresponding to the target device. The simulation module 11 uses the model to output virtual measured data obtained when the target device is in at least one of one or more failure modes. For example, in an virtual case in which the rotor fan of the generator 2a is damaged, vibration data produced by a simulation using a generator model is outputted.

The measured data obtaining module 12 is a block that obtains measured data from the target device. For example, measured vibration data from the generator 2a is transferred from the controller 2d to the measured data obtaining module 12 via the communication network 3.

The failure mode identifying module 13 receives the virtual measured data from the simulation module 11, receives the measured data from the measured data obtaining module 12, and identifies a failure mode of the target device based on the received virtual measured data and measured data. For example, in a case where the value of the virtual vibration data described above is close to the value of the vibration data described above, the failure mode identifying module 13 determines that the rotor fan of the generator 2a has been damaged.

A data receiving module that receives both the virtual measured data and the measured data may be incorporated in the failure mode identifying module 13 or may not be incorporated therein but may be provided in the failure diagnosis apparatus 1. The simulation module 11, the measured data obtaining module 12, and the data receiving module are collectively referred to as a monitoring apparatus in the failure diagnosis apparatus 1.

The output module 14 is a block that outputs the failure mode identification result received from the failure mode identifying module 13. The output module 14, for example, displays the failure mode identification result on the monitor of the display module 1d, saves the result in the storage of the storage module 1e, and transmits the result to an external apparatus via the communication module 1b. For example, a determination result showing that the rotor fan of the generator 2a has been damaged is displayed on the monitor.

The output module 14 may output, as the failure mode identification result, a failure mode determined to have occurred in the target device or may output a failure mode determined to have potentially occurred in the target device. An example of the former case is on-monitor display of a determination result showing "rotor coil ventilation has been choked and the rotor fan has been damaged in the generator 2a." An example of the latter case is on-monitor display showing "at least one of a layer short circuit, rotor coil ventilation choke and rotor fan damage have potentially occurred in the generator 2a."

Figure 2:
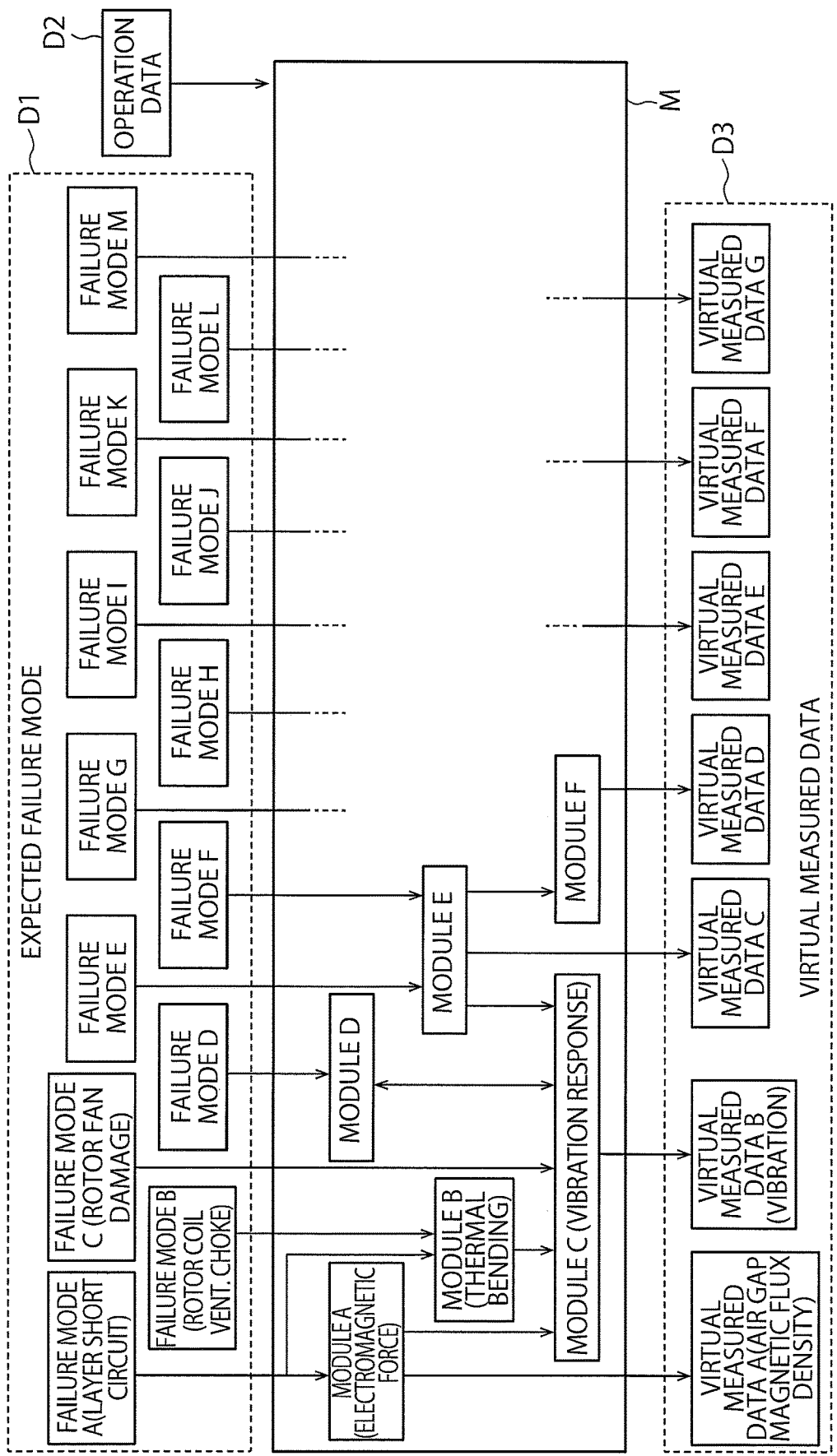
FIG. 2 is a schematic view for describing the operation of a generator model of the first embodiment.

FIG. 2 is a schematic view for describing the operation of a generator model of the first embodiment.

A generator model M shown in FIG. 2 receives, as inputs, one or more failure modes (expected failure mode) D1 expected in the generator 2a and operation data D2 obtained from the generator 2a, and provides, as outputs, values of a plurality of types of virtual measured data D3.

FIG. 2 shows failure modes A to M as examples of the expected failure mode D1. For example, the failure mode A is a layer short circuit in the generator 2a. The failure mode B is rotor coil ventilation choke in the generator 2a. The failure mode C is damage of the rotor fan of the generator 2a. These failure modes are expended to occur in the generator 2a. The number of failure modes or the types thereof is not limited to the number or the types shown in FIG. 2.

The operation data D2 is data representing the operation state of the generator 2a and is transferred from the controller 2d to the simulation module 11 over the communication network 3. The operation data D2 is, for example, time-series data on electric power outputted from the generator 2a (electricity output).

FIG. 2 shows virtual measured data A to G as examples of the virtual measured data D3. For example, the virtual measured data A is the air gap magnetic flux density in the generator 2a. The virtual measured data B is data (amplitude and phase, for example) on the vibration of the rotor of the generator 2a.

The generator model M is formed of a set of a variety of modules that output the virtual measured data D3 based on the expected failure mode D1 and the operation data D2. FIG. 2 shows modules A to F as examples of the variety of modules. For example, the module A is a module that handles the electromagnetic force of the generator 2a. The module B is a module that handles thermal bending of the generator 2a. The module C is a module that handles a vibration response of the generator 2a. These modules are each formed, for example, of a mathematical expression based on a physical model, a table or a function based on a result of numerical calculation performed in advance, or a table or a function based on experiences.

The failure diagnosis apparatus 1, when it determines whether or not the failure mode A has occurred in the generator 2a (or whether or not failure mode A has probably occurred, the same holds true for the following description), inputs data on the failure mode A to the generator model M. In this case, the modules A and B output the virtual measured data A and data to the module C based on the data on the failure mode A, and the module C outputs the virtual measured data B based on the data from the modules A and B. The virtual measured data A and B are used to determine whether or not the failure mode A has occurred in the generator 2a.

Figure 3:
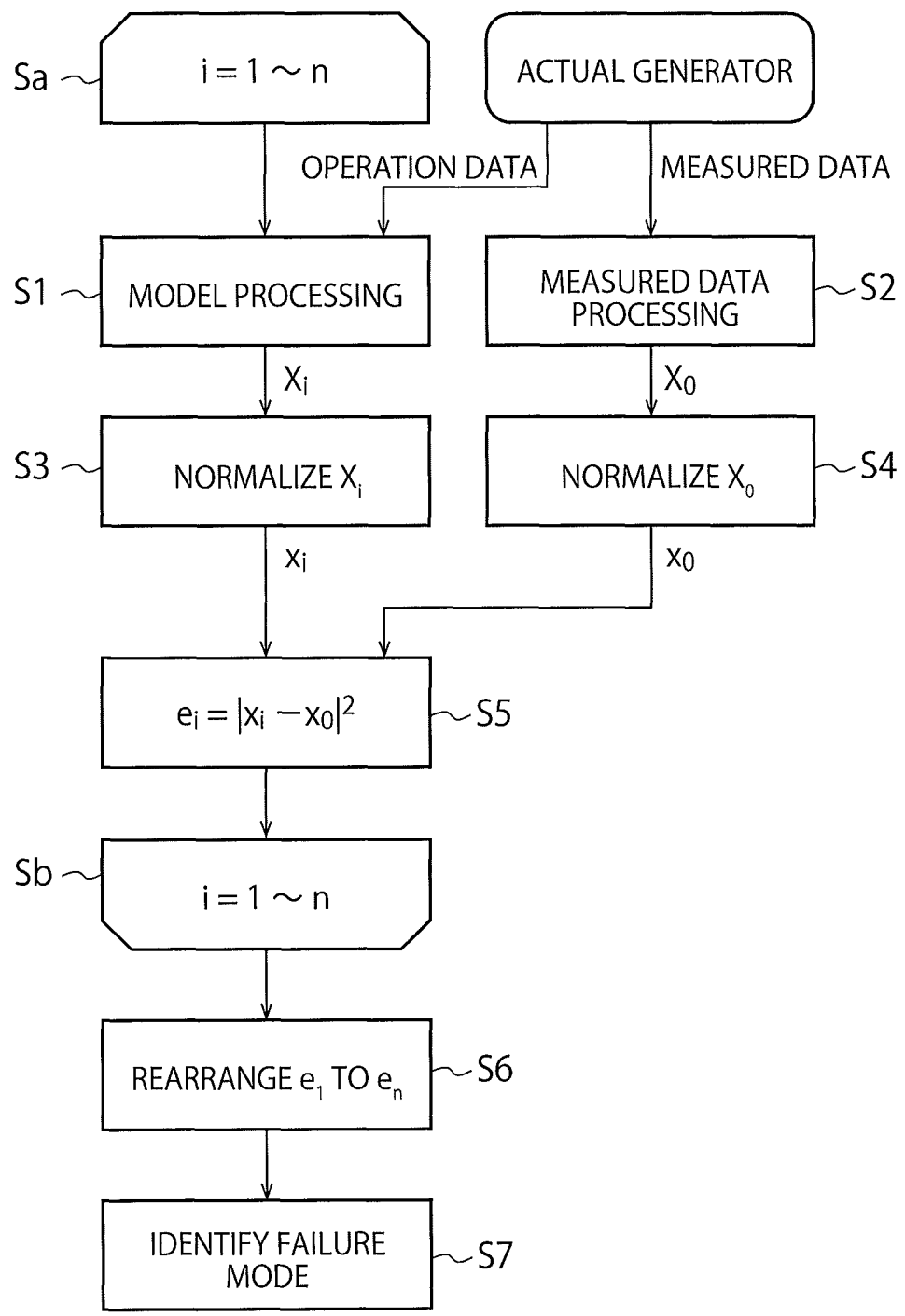
FIG. 3 is a flowchart showing the operation of the failure diagnosis apparatus of the first embodiment.

FIG. 3 is a flowchart showing the operation of the failure diagnosis apparatus 1 of the first embodiment. FIG. 3 will be described with reference to the case where the generator 2a is the target device.

The generator model M used by the simulation module 11 first outputs the virtual measured data D3 on a predetermined failure mode of the generator 2a based on the expected failure mode D1 and the operation data D2 (process S1). For example, the simulation module 11 outputs, as the virtual measured data D3, virtual measured data $X_i$ on a failure mode i out of failure modes 1 to n, where "n" is an integer greater than or equal to 1, and "i" is an integer that satisfies $1 \leq i \leq n$. The virtual measured data $X_i$ is a K-th-order vector formed of values of K types of the virtual measured data, where K is an integer greater than or equal to two. As understood from the loop process formed of the processes Sa to Sb shown in FIG. 3, the failure diagnosis apparatus 1 carries out processes S1 to S5 for each of the failure modes 1 to n. The failure mode i represents an arbitrary failure mode out of the failure modes 1 to n.

On the other hand, the measured data obtaining module 12 obtains and processes measured data from the generator 2a and converts the data into processed measured data $X_0$, which can be compared with the virtual measured data $X_i$ (process S2). The processed measured data $X_0$ is a K-th-order vector formed of values of K types of the processed measured data.

In process S2, for example, time-series data on the vibration of the rotor of the generator 2a is Fourier-transformed into frequency data, and the amplitude at a predetermined frequency in the frequency data is outputted as the processed measured data $X_0$. Since the frequency at which the measured data from the generator 2a is sampled varies depending on the type of the measured data in some cases, a sampling frequency matching process is carried out in process S2. For example, in the conversion process described above, a time-series waveform of the vibration measured at a high sampling frequency (512 Hz, for example) is converted into a frequency waveform, and the overall amplitude of the rotor, the amplitude and phase of a vibration component synchronous to the number of revolutions of the rotor, the amplitude of the second-harmonic component of the number of revolutions of the rotor, the amplitude of a vibration component asynchronous to the rotation of the rotor, and the temporal rate of change in each of the factors described above are, for example, extracted from the frequency waveform and outputted as the components of the processed measured data $X_0$. Further, since the vibration of the rotor is associated with the metal temperature of the bearing, the metal temperature may be outputted as a component of the processed measured data $X_0$.

The simulation module 11 normalizes relations among the K values of the virtual measured data $X_i$ and outputs the normalized virtual measured data $x_i$ (process S3). The normalization is the process of changing the contribution factors (weighting) of the values of the virtual measured data $X_i$ for accurate identification of the failure mode i. For example, in the generator 2a, in a case where the temporal rate of change in the overall amplitude more greatly affects the failure mode i than the overall amplitude, the virtual measured data $X_i$ is normalized into the virtual measured data $x_i$ by multiplying the temporal rate of change in the overall amplitude by a coefficient of the contribution factor thereof. The effects of the overall amplitude and the temporal rate of change therein on the failure mode i can therefore be accurately evaluated. Similarly, the measured data obtaining module 12 normalizes relations among the K values of the processed measured data $X_0$ and outputs the normalized processed measured data $x_0$ (process S4). The normalized processed measured data $x_0$ is hereinafter simply referred to as "normalized measured data $x_0$."

The normalized virtual measured data $x_i$ is a K-th-order vector formed of values of K types of the virtual measured data. Similarly, the normalized measured data $x_0$ is a K-th-order vector formed of values of K types of the measured data. The values of the virtual measured data $x_i$ and the measured data $x_0$ (vector components) are, for example, the overall amplitude of the rotor, the amplitude and phase of a vibration component synchronous to the number of revolutions of the rotor, the amplitude of the second-harmonic component of the number of revolutions of the rotor, the amplitude of a vibration component asynchronous to the rotation of the rotor, the temporal rate of change in each of the factors described above, and the metal temperature of the bearing. The method for normalizing the virtual measured data $X_i$ and the method for normalizing the measured data $x_0$ may be the same or differ from each other as long as normalized data $x_i$ and $x_0$ that can be compared with each other can be derived.

The failure mode identifying module 13 then receives the normalized virtual measured data $x_i$ and the normalized measured data $x_0$ and calculates the sum of squares of the differences $e_i$ between the two types of data (process S5). The sum of squares of the differences $e_i$ can be derived by calculating the differences (k-th-order vectors) $x_i$-$x_0$ between the virtual measured data $x_i$ and the measured data $x_0$ and squaring the norm $|x_i$-$x_0|$ of the differences $x_i$-$x_0$. In the process S5, the dot product between $x_i$ and $x_0$ may be calculated in place of the sum of squares of the differences $x_i$-$x_0$.

The sum of squares of the differences $e_i$ is smaller when the measured data $x_0$ from the generator 2a is closer to the virtual measured data $x_i$ on the failure mode i. The sum of squares of the differences $e_i$ can therefore be used to identify the failure mode i. The operation data D2 described above may not be used to calculate the virtual measured data D3 in process S1 but may be used to calculate the sum of squares of the differences $e_i$ in process S5 or may be used to identify operation data (identify load factor, for example) in process S7.

The failure diagnosis apparatus 1 carries out processes S1 to S5 for each of the failure modes 1 to n. As a result, sums of squares of the differences $e_1$ to $e_n$ corresponding to the failure modes 1 to n are calculated. The failure mode identifying module 13 rearranges the sums of squares of the differences $e_1$ to $e_n$ in the ascending order (process S6). The rearrangement corresponds to rearrangement in the descending order of possibility of occurrence of the failure modes 1 to n.

Process S6 is, however, not an essential process, and the rearrangement is not performed in the first place in some cases, and even in the case where the rearrangement is performed, the rearrangement is performed based not on the magnitudes of the sums of squares of the differences $e_1$ to $e_n$ but based, for example, on a predetermined priority. The identification in process S7 is therefore performed in consideration of a variety of situations including the presence or absence of process S6.

The failure mode identifying module 13 then identifies the failure mode of the generator 2a based on the sums of squares of the differences $e_1$ to $e_n$ (process S7). Specifically, the failure mode identifying module 13 determines that the failure mode i has occurred (or have potentially occurred) when the sum of squares of the differences $e_i$ is smaller than a standardized determination reference value. Since the sums of squares of the differences $e_i$ to $e_n$ are rearranged in the ascending order in process S6, only the first to m-th ("m" is an integer that satisfies 1≤m≤n) sums of squares of the differences in the rearrangement order may be compared with the standardized determination reference value. That is, a predetermined number of failure modes in the rearrangement order (first to m-th failure modes) may be targets to be identified. In this case, m failure modes are identified at the maximum.

The failure mode identifying module 13 may not necessarily determine that a layer short circuit has occurred or has potentially occurred in the generator 2a but may determine that there is a symptom of occurrence of a layer short circuit in the generator 2a. The failure mode identifying module 13 can therefore detect a symptom of a layer short circuit in the generator 2a before the layer short circuit actually occurs. As described above, the failure mode identifying module 13 may identify a failure mode in which failure has occurred or may identify a failure mode in which a symptom of failure is seen. The identification in the latter case can be achieved, for example, by setting the standardized determination reference value described above at a value greater than that in the identification in the former case.

The term "failure mode" is used in some cases as a term including only the case where failure has occurred (for example, failure mode and effect analysis (FMEA)), but in the present specification, the term is used as a term that may include the case where failure has occurred and the case where a symptom of failure is seen. The failure mode identifying module 13 in the present embodiment may be configured to identify only a failure mode relating to the failure having occurred or may be configured to identify a failure mode relating to failure a symptom of which is seen as well as a failure mode relating to the failure having occurred.

The output module 14 then outputs the failure mode identification result received from the failure mode identifying module 13. For example, the monitor shows that a layer short circuit, rotor coil ventilation choke, and rotor fan damage have potentially occurred in the generator 2a. In this case, the three failure modes may be displayed in the order obtained in process S6, that is, in the ascending order of the sums of squares of the differences.

Figure 4:
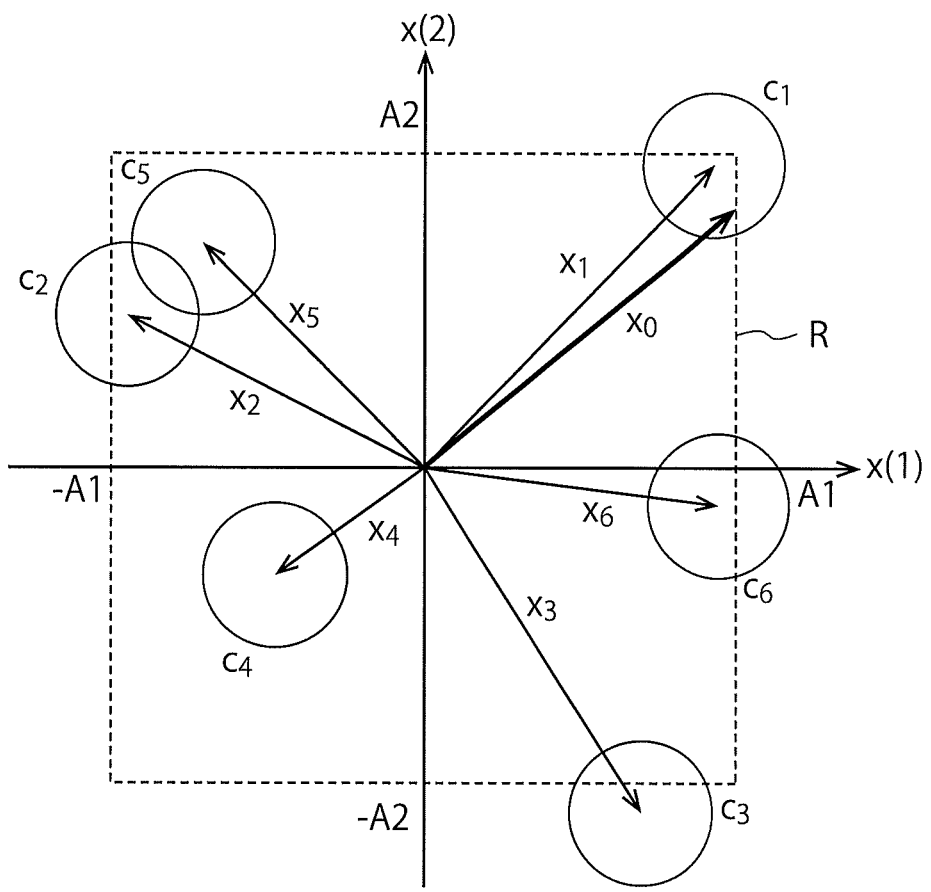
FIG. 4 shows a graph for describing virtual measured data in the first embodiment.

FIG. 4 shows a graph for describing the virtual measured data in the first embodiment.

The horizontal axis of FIG. 4 represents a first component (x(1)) of the virtual measured data $x_i$ or the measured data $x_0$, and the vertical axis of FIG. 4 represents a second component (x(2)) of the virtual measured data $x_i$ or the measured data $x_0$. FIG. 4 shows only the first and second components out of the first to K-th components of the virtual measured data $x_i$ and the measured data $x_0$. More accurately, the virtual measured data $x_i$ and the measured data $x_0$ are expressed in the form of points in a K-dimensional space.

The circles $c_1$ to $c_6$ in FIG. 4 are drawing versions of determination reference circles corresponding to the standardized determination reference values used in process S7. For example, in a case where the measured data $x_0$ is located in the determination reference circle $c_1$ for the virtual measured data $x_1$, the sum of squares of the differences $e_1$ between the virtual measured data $x_1$ and the measured data $x_0$ is smaller than the radius of the determination reference circle. The failure mode 1 is therefore identified in process S7.

Since the determination reference circle $c_2$ and the determination reference circle $c_5$ in FIG. 4 have an overlapping portion, the measured data $x_0$ can be located both in the determination reference circle $c_2$ and the determination reference circle $c_5$ at the same time. In this case, the failure modes 2 and 5 are both identified in process S7. The determination reference circles shown in FIG. 4 (the case where K=2 is explicitly shown by way of example) are each expressed as a K-dimensional sphere in the K-dimensional space.

In the present embodiment, as the determination reference circle $c_1$ for the virtual measured data $x_1$, a first circle that is a small circle and a second circle that is a large circle may be prepared. In this case, the first circle may be used to determine that failure has occurred in the generator $2a$, and the second circle may be used to determine that a symptom of failure is seen in the generator $2a$. Further, two or more circles having different radii may be prepared as the determination reference circle $c_1$ for the virtual measured data $x_1$, and two or more types of determination may be performed. The same holds true for the determination reference circles $c_2$ to $c_6$.

Figure 5:
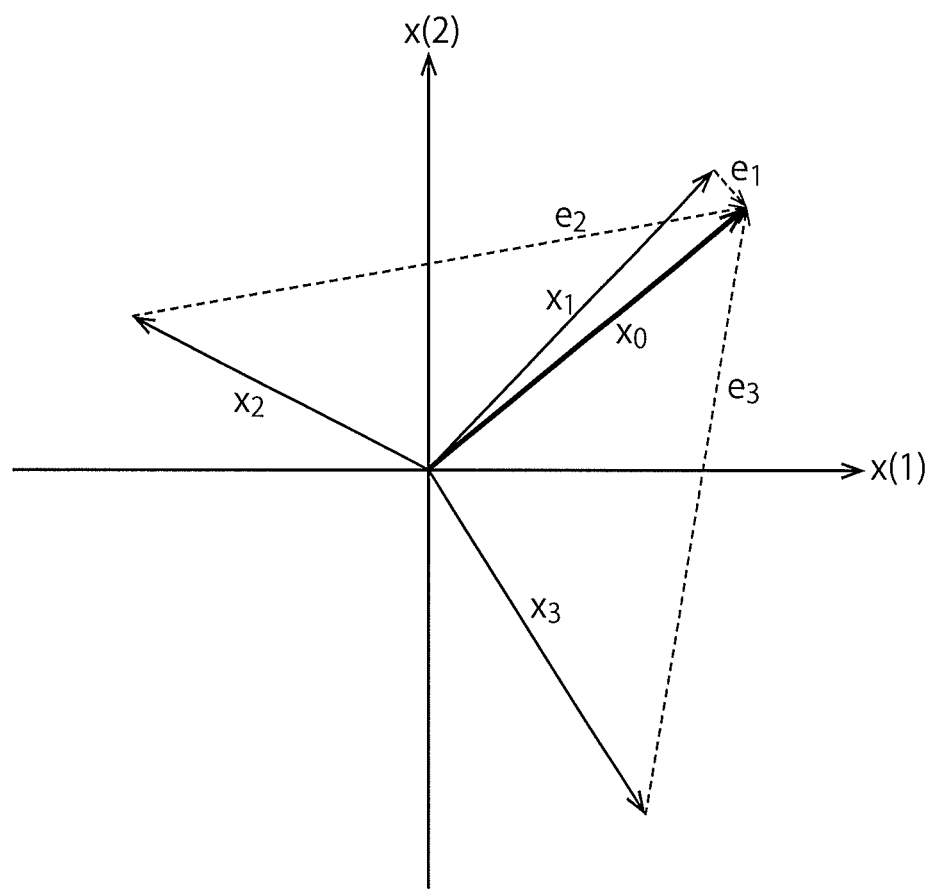
FIG. 5 is another graph for describing the virtual measured data in the first embodiment.

FIG. 5 is another graph for describing the virtual measured data in the first embodiment.

Consider the sum of squares of the differences $e_i$ between the virtual measured data $x_i$ and the measured data $x_0$, and the fact that a smaller difference means higher probability of occurrence of failure can be used to estimate the failure probability in accordance with the magnitude of the sum of squares of the differences $e_i$, as shown in FIG. 5. FIG. 5 shows that the probability of the failure mode 1 corresponding to $x_1$ is higher than the probabilities of the failure modes 2 and 3 corresponding to $x_2$ and $x_3$. The evaluation can instead be performed by using the magnitude itself of the sum of squares of the differences $e_i$.

Figure 6:
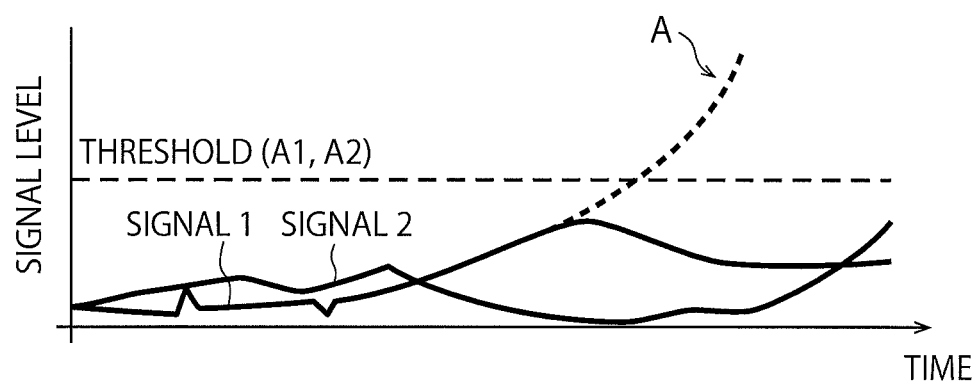
FIG. 6 shows a graph for describing a failure diagnosis method.

FIG. 6 shows a graph for describing a failure diagnosis method.

Signals 1 and 2 are signals obtained from the generator $2a$, which is a target device of diagnosis and correspond to the first and second components of the measured data $x_0$ described above, respectively. Reference characters A1 and A2 denote thresholds of the signals 1 and 2, respectively. A curve A shows that the level of the signal 1 exceeds the threshold A1 so that the generator $2a$ will reach an inoperable state. In a typical failure diagnosis method, when either the signal 1 or 2 reaches the threshold A1 or A2, it is determined that failure has occurred in the generator $2a$ or a symptom of failure is seen in the generator $2a$. The situation indicated by the curve A is avoided this way.

This failure avoidance is also shown in FIG. 4. The area labeled with reference character R in FIG. 4 is an area where the magnitude of the first component (signal 1) of the measured data $x_0$ is smaller than the threshold A1 and the magnitude of the second component (signal 2) of the measured data $x_0$ is smaller than the threshold A2. When the measured data $x_0$ does not fall within the area R, occurrence of failure or a symptom of failure is detected.

On the other hand, the failure diagnosis apparatus 1 of the present embodiment expects in advance one or more failure modes that may occur in the generator $2a$ and uses a generator model to derive virtual measured data obtained when the failure modes occur. The failure diagnosis apparatus 1 of the present embodiment can therefore identify a failure mode in the generator $2a$ by comparing the virtual measured data from the generator model with measured data from the generator $2a$. Specifically, instead of the area R shown in FIG. 4, the determination reference circles $c_1$ to $c_6$ shown in FIG. 4 are used to allow failure diagnosis.

The failure diagnosis apparatus 1 of the present embodiment can identify a failure mode and detect occurrence of failure or a symptom of failure. That is, even in the area R, where the generator $2a$ is considered to be normal in the threshold-based determination, the failure diagnosis apparatus 1 can identify a specific failure location and a cause of the failure before the failure occurs based on an integrated state quantity that is the combination of the signal 1 and the signal 2.

As described above, in the present embodiment, instead of analyzing measured data to identify a failure mode, a generator model is used to derive virtual measured data from an expected failure mode, and the virtual measured data is compared with measured data for identification of the failure mode.

The failure diagnosis of the present embodiment allows a variety of beneficial advantages to be provided.

For example, analyzing past instances of failure of the generator $2a$ and reflecting the result of the analysis in an expected failure mode and a generator model allows accurate failure diagnosis of the generator $2a$. The reason for this is that the analysis of the failure instances allows detailed analysis of measured data obtained from the generator $2a$ at the time of the failure and before the failure, and the result of the detailed analysis is reflected in the expected failure mode and the generator model.

Further, when the number of past failure instances and the number of results of the analysis are accumulated by a larger amount, the normalizing method and the standardized determination reference values described above and other factors can be improved, whereby the accuracy of the failure diagnosis can be further improved, and failure and failure symptoms can be sensed earlier. The normalizing method and the standardized determination reference values may be changed by the user of the failure diagnosis apparatus 1 through the operation module $1c$.

Failure of an instrument in the power plant 2 is likely to occur in an instrument including a rotor and an instrument that produces an operating fluid for the instrument including a rotor. The reason for this is that friction and vibration resulting from the rotation of the rotor and heat and pressure generated when the operating fluid is produced affect the instruments. The failure diagnosis apparatus 1 therefore desirably handles the instruments described above as a target device of diagnosis.

As described above, according to the present embodiment, failure diagnosis of a target device can be accurately performed.

While certain embodiments have been described, these embodiments have been presented by way of example only, and are not intended to limit the scope of the inventions. Indeed, the novel apparatuses, methods and media described herein may be embodied in a variety of other forms; furthermore, various omissions, substitutions and changes in the form of the apparatuses, methods and media described herein may be made without departing from the spirit of the inventions. The accompanying claims and their equivalents are intended to cover such forms or modifications as would fall within the scope and spirit of the inventions.

The invention claimed is:

1. A failure diagnosis apparatus comprising at least one processor which comprises:

a simulation module configured to simulate a target device to output virtual measured data obtained when the target device is in at least any one of one or more failure modes;

a measured data obtaining module configured to obtain measured data that is measured from the target device; and a failure mode identifying module configured to identify a failure mode of the target device based on differences between values of a plurality of types of the virtual measured data and values of a plurality of types of the measured data, wherein the failure mode identifying module determines whether or not failure has occurred in the target device based on whether or not a K-th-order vector that corresponds to the differences is located in a K-dimensional sphere having a first radius, and determines whether or not there is a symptom of failure in the target device based on whether or not the K-th-order vector is located in a K-dimensional sphere having a second radius different from the first radius, where K is an integer greater than or equal to two.

2. The apparatus of claim 1, wherein the simulation module normalizes relations among the values of the plurality of types of the virtual measured data to generate normalized virtual measured data, the measured data obtaining module normalizes relations among the values of the plurality of types of the measured data to generate normalized measured data, and the failure mode identifying module identifies the failure mode based on the normalized virtual measured data and the normalized measured data.

3. The apparatus of claim 1, wherein the failure mode identifying module arranges the one or more failure modes in a descending order of possibility of occurrence of the one or more failure modes based on the differences, and identifies a predetermined number of failure modes in the arrangement order.

4. The apparatus of claim 1, wherein the simulation module performs the simulation by using a model that receives, as inputs, the one or more failure modes expected in the target device and operation data obtained from the target device, and provides, as outputs, the values of the plurality of types of the virtual measured data.

5. The apparatus of claim 1, wherein the failure mode identifying module identifies the failure mode based on the virtual measured data, the measured data, and operation data obtained from the target device.

6. The apparatus of claim 1, further comprising an output module configured to output a result of the identification of the failure mode.

7. The apparatus of claim 6, wherein the result of the identification of the failure mode represents a failure mode determined to have occurred in the target device or a failure mode determined to have potentially occurred in the target device.

8. A failure diagnosis method comprising:

simulating, by a simulation module, a target device to output virtual measured data obtained when the target device is in at least any one of one or more failure modes;

obtaining, by a measured data obtaining module, measured data that is measured from the target device; and identifying, by a failure mode identifying module, a failure mode of the target device based on differences between values of a plurality of types of the virtual measured data and values of a plurality of types of the measured data, wherein the failure mode identifying module determines whether or not failure has occurred in the target device based on whether or not a K-th-order vector that corresponds to the differences is located in a K-dimensional sphere having a first radius, and determines whether or not there is a symptom of failure in the target device based on whether or not the K-th-order vector is located in a K-dimensional sphere having a second radius different from the first radius, where K is an integer greater than or equal to two.

9. A computer readable recording medium on which a failure diagnosis program is non-temporarily recorded, the failure diagnosis program causing a computer to perform a failure diagnosis method comprising:

simulating, by a simulation module, a target device to output virtual measured data obtained when the target device is in at least any one of one or more failure modes;

obtaining, by a measured data obtaining module, measured data that is measured from the target device; and identifying, by a failure mode identifying module, a failure mode of the target device based on differences between values of a plurality of types of the virtual measured data and values of a plurality of types of the measured data, wherein the failure mode identifying module determines whether or not failure has occurred in the target device based on whether or not a K-th-order vector that corresponds to the differences is located in a K-dimensional sphere having a first radius, and determines whether or not there is a symptom of failure in the target device based on whether or not the K-th-order vector is located in a K-dimensional sphere having a second radius different from the first radius, where K is an integer greater than or equal to two.

* * * * *